US008930456B2

(12) United States Patent
Nace

(10) Patent No.: US 8,930,456 B2
(45) Date of Patent: Jan. 6, 2015

(54) METHOD AND SYSTEM OF SUGGESTING CONTACTS THROUGH THE DISPLAY OF PUBLIC POSTS WITHIN A SOCIAL NETWORKING SERVICE

(75) Inventor: Adam Michael Nace, Bright (CA)

(73) Assignee: Google Inc., Mountain View, CA (US)

( * ) Notice: Subject to any disclaimer, the term of this patent is extended or adjusted under 35 U.S.C. 154(b) by 346 days.

(21) Appl. No.: 13/419,350

(22) Filed: Mar. 13, 2012

(65) Prior Publication Data

US 2013/0246518 A1 Sep. 19, 2013

(51) Int. Cl.
*G06F 15/16* (2006.01)

(52) U.S. Cl.
USPC .................. 709/204; 705/1; 705/1.1; 706/12; 707/784; 707/999.005

(58) Field of Classification Search
USPC .......... 709/204; 705/1, 1.1; 706/12; 707/784, 707/999.005
See application file for complete search history.

(56) References Cited

U.S. PATENT DOCUMENTS

| | | | | |
|---|---|---|---|---|
| 8,150,844 | B2 * | 4/2012 | Redstone et al. | 707/724 |
| 8,510,380 | B2 * | 8/2013 | Faller et al. | 709/204 |
| 8,539,086 | B2 * | 9/2013 | Mallet et al. | 709/227 |
| 8,583,690 | B2 * | 11/2013 | Sittig et al. | 707/784 |
| 8,631,084 | B2 * | 1/2014 | Garcia | 709/207 |
| 2008/0140650 | A1 * | 6/2008 | Stackpole | 707/5 |
| 2009/0228513 | A1 | 9/2009 | Tian | |
| 2009/0319288 | A1 * | 12/2009 | Slaney et al. | 705/1 |
| 2010/0191844 | A1 * | 7/2010 | He et al. | 709/224 |
| 2011/0004561 | A1 | 1/2011 | Shahine et al. | |
| 2011/0106896 | A1 * | 5/2011 | Baransky et al. | 709/206 |
| 2012/0041907 | A1 * | 2/2012 | Wang et al. | 706/12 |
| 2012/0158751 | A1 * | 6/2012 | Tseng | 707/751 |
| 2013/0139048 | A1 * | 5/2013 | Dhawan et al. | 715/234 |
| 2014/0025765 | A1 * | 1/2014 | Mallet et al. | 709/206 |

FOREIGN PATENT DOCUMENTS

| | | |
|---|---|---|
| KR | 10-2010-0053152 | 5/2010 |
| KR | 10-2011-0048126 | 5/2011 |
| KR | 10-2012-0006182 | 1/2012 |

OTHER PUBLICATIONS

Social Networking Websites Review 2012—TopTenREVIEWS, last viewed on Oct. 21, 2011, retrieved from <http://social-networking-websites-review.toptenreviews.com>.
Facebook 2012—TopTenREVIEWS, last viewed on Oct. 21, 2011, retrieved from <http://social-networking-websites-review.toptenreviews.com/facebook-review.html>.

(Continued)

*Primary Examiner* — Michael C Lai
(74) *Attorney, Agent, or Firm* — McDermott Will & Emery LLP

(57) ABSTRACT

A system and method for displaying public posts within a social networking service. In one aspect, a method includes determining a plurality of suggested contacts associated with a user of the social networking service, with each suggested contact of the plurality of suggested contacts being associated with a plurality of public posts. For each suggested contact associated with the plurality of public posts, the method includes ranking the plurality of public posts for the suggested contact and selecting one or more public posts from the plurality of public posts for the suggested contact based on the ranking. The method further includes providing for the display of the selected one or more public posts along with a corresponding confirmation interface component allowing acceptance of the suggested contact as a contact of the user. Machine-readable media are also provided.

29 Claims, 5 Drawing Sheets

300

(56) References Cited

OTHER PUBLICATIONS

MySpace 2012—TopTenREVIEWS, last viewed on Oct. 21, 2011, retrieved from <http://social-networking-websites-review.toptenreviews.com/myspace-review.html>.
Bebo 2012—TopTenREVIEWS, last viewed on Oct. 21, 2011, retrieved from <http://social-networking-websites-review.toptenreviews.com/bebo-review.html>.
Friendster 2012—TopTenREVIEWS, last viewed on Oct. 21, 2011, retrieved from <http://social-networking-websites-review.toptenreviews.com/friendster-review.html>.
hi5 2012—TopTenREVIEWS, last viewed on Oct. 21, 2011, retrieved from <http://social-networking-websites-review.toptenreviews.com/hi5-review.html>.
Orkut 2012—TopTenREVIEWS, last viewed on Oct. 21, 2011, retrieved from <http://social-networking-websites-review.toptenreviews.com/orkut-review.html>.
PerfSpot 2012—TopTenREVIEWS, last viewed on Oct. 21, 2011, retrieved from <http://social-networking websites-review.toptenreviews.com/perfspot-review.html>.
Zorpia 2012—TopTenREVIEWS, last viewed on Oct. 21, 2011, retrieved from <http://social-networking-websites-review.toptenreviews.com/zorpia-com-review.html>.
Habbo 2012—TopTenREVIEWS, last viewed on Oct. 21, 2011, retrieved from <http://social-networking-websites-review.toptenreviews.com/habbo-review.html>.
Netlog 2012—TopTenREVIEWS, last viewed on Oct. 21, 2011, retrieved from <http://social-networking-websites-review.toptenreviews.com/netlog-review.html> .

* cited by examiner

400

METHOD AND SYSTEM OF SUGGESTING CONTACTS THROUGH THE DISPLAY OF PUBLIC POSTS WITHIN A SOCIAL NETWORKING SERVICE

BACKGROUND

1. Field

The present disclosure generally relates to social networking, and more particularly to providing for display of a message within a social networking service.

2. Description of the Related Art

Social networking services are electronic services that allow users to become a member of the social network and often include creating and maintaining a user profile. Users may interact with other users with profiles in ways such as sharing content with another user, sending messages, publishing public posts to all other users or a group of other users, chat with other users, and the like. In some social networks, a user may view public posts of other users through a user interface of the social network. Social networks typically encourage new members to join the network. New and existing users may be provided with suggested contacts to broaden the user's network.

SUMMARY

The disclosed subject matter relates to displaying public posts within a social networking service. The method may also include determining, using one or more computing devices, a plurality of suggested contacts associated with a user of the social networking service, wherein each suggested contact of the plurality of suggested contacts is associated with a plurality of public posts. For each suggested contact associated with the plurality of posts, the method includes ranking, using one or more computing devices, the plurality of public posts for the suggested contact and selecting, using one or more computing devices, one or more public posts from the plurality of public posts for the suggested contact based on the ranking. The method additionally provides for the display, using one or more computing devices, of the selected one or more public posts along with a corresponding confirmation interface component allowing acceptance of the suggested contact as a contact of the user.

The disclosed subject matter further relates to a system for displaying public posts within a social networking service. The system includes one or more processor(s) and a memory containing processor-executable instructions. When executed by the processor(s), the system determines a plurality of suggested contacts associated with a user of the social networking service, wherein each suggested contact of the plurality of suggested contacts is associated with a plurality of public posts. For each suggested contact associated with the plurality of public posts, the system ranks the plurality of public posts for the suggested contact and selects one or more public posts from the plurality of public posts for the suggested contact based on the ranking. The system also generates a post for an additional suggested contact with no public posts based on an association of the additional suggested contact with the user and provides for the display of the generated post and the selected one or more public posts along with a corresponding confirmation interface component allowing acceptance of the suggested contact and the additional suggested contact as contacts of the user.

The disclosed subject matter also relates to a machine-readable storage medium comprising machine-readable instructions for displaying public posts within a social networking service. The method includes determining a plurality of suggested contacts associated with a user of the social networking service, wherein each suggested contact of the plurality of suggested contacts is associated with a plurality of public posts. For each suggested contact associated with the plurality of public posts, the method includes ranking the plurality of public posts for the suggested contact and selecting one or more public posts from the plurality of public posts for the suggested contact. The method further includes providing for display of the selected one or more public posts along with a corresponding confirmation interface component allowing acceptance of the suggested contact as a contact of the user in the social networking service, receiving a user request to accept a suggested contact of the plurality of suggested contacts as the contact of the user in the social networking service via the corresponding confirmation interface component, and establishing the suggested contact as the contact of the user in the social networking service.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for the purpose of explanation, several aspects of the subject technology are set forth in the following figures.

DETAILED DESCRIPTION

Overview

In the following detailed description, numerous specific details are set forth to provide a full understanding of the subject technology. It will be apparent, however, that different aspects of the subject technology may be practiced without some of these specific details. In other instances, well-known structures and techniques have not been shown in detail so as not to obscure the disclosure.

The disclosed subject matter describes systems and techniques for displaying public posts within a social networking service such as an online social network or social networking website. The term "public post" as used herein encompasses its plain and ordinary meaning, including, but not limited to a piece of content that has been designated by the poster as available to all users of the social networking service and a piece of content that has been designated by the poster as visible to the user to whom the poster is being suggested as a contact. A user may desire to choose a suggested contact based on the suggested contact's posted content. Suggested contacts may be presented upon initially establishing a profile or membership on the social networking service. In order to present a posted content-centric view, instead of a profile-centric view of the suggested contacts, one or more public posts of each of the suggested contacts may be displayed so that the user may view selected content of the suggested contact when choosing whether to add the suggested contact as a contact of the user on the social networking service. The public post for display may be chosen based on a ranking of each post. A post may be generated for a suggested contact without any posts or without any public posts.

Example Systems

Figure 1:
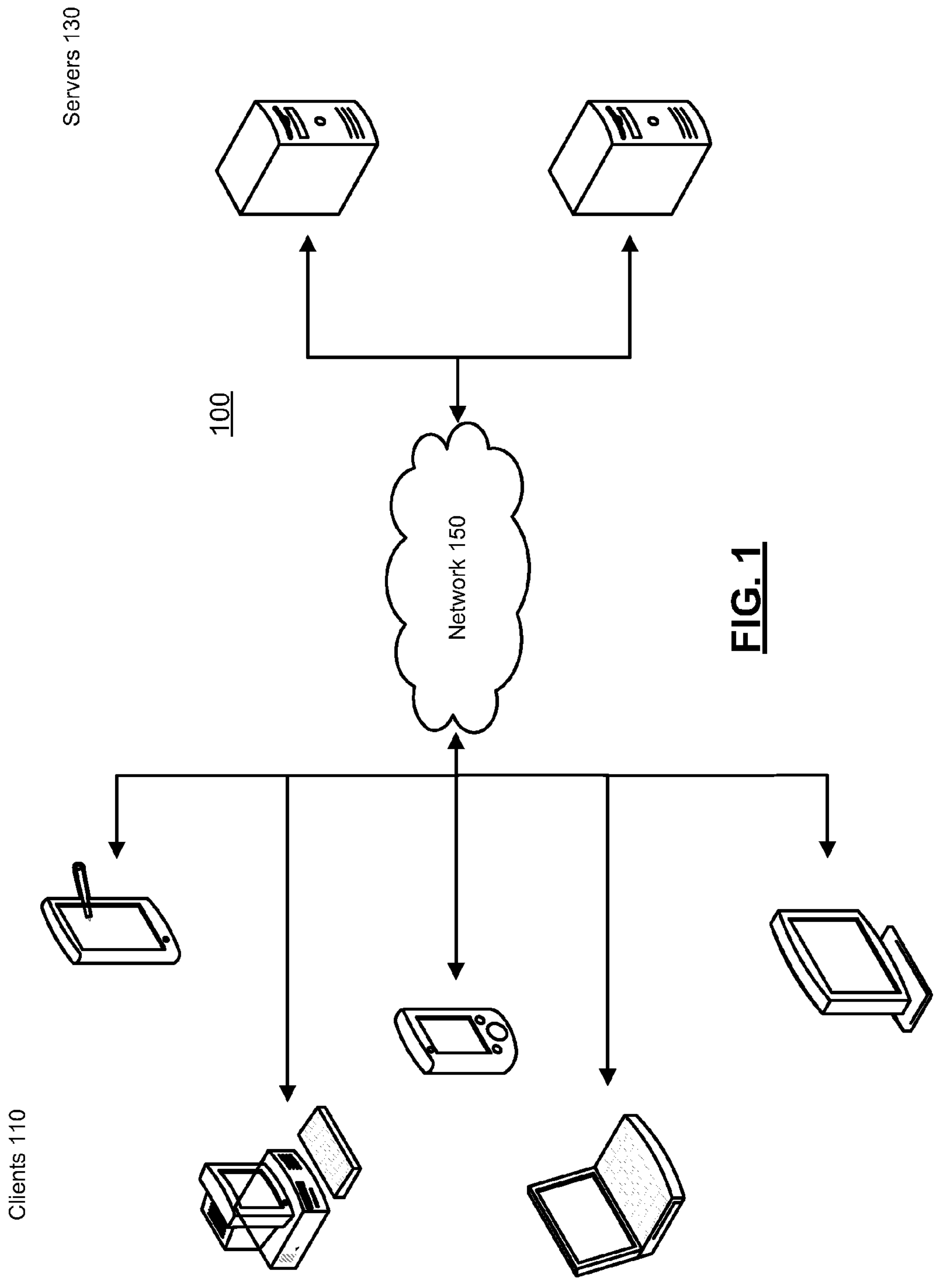
FIG. 1 illustrates an example system for displaying public posts within a social networking service.

Turning to the drawings, FIG. 1 illustrates an example system 100 for displaying public posts within a social networking service. The system 100 includes computing devices connected over a network 150. The phrase "computing device" as used herein encompasses its plain and ordinary meaning, including, but not limited to any device that contains any appropriate processor, memory, and communications capabilities for displaying public posts within a social network including appropriate clients and servers. The architecture may include computing devices such as clients 110 and servers 130 connected over the network 150.

The system 100 is comprised of client(s) 110, server(s) 130 and the network 150 in any combination or configuration that permits the display of public posts of suggested contacts to a user of a social networking service, including implementations with multiple servers 130. Each of the clients 110 can be, for example, desktop computers, laptop computers, mobile devices (e.g., a smartphone, tablet computer, or PDA), set top boxes (e.g., for a television), video game consoles, or any other devices having an appropriate processor, memory, and communications capabilities. In certain instances, different versions and/or configurations of the system that include subject technology as disclosed herein are available for download from a server 130 and subsequent installation on client 110. The servers 130 can be any device having a processor, memory, and communications capability for hosting the data for installing and hosting the system. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a ring network, a mesh network, a star-bus network, tree or hierarchical network, and the like.

Figure 2:
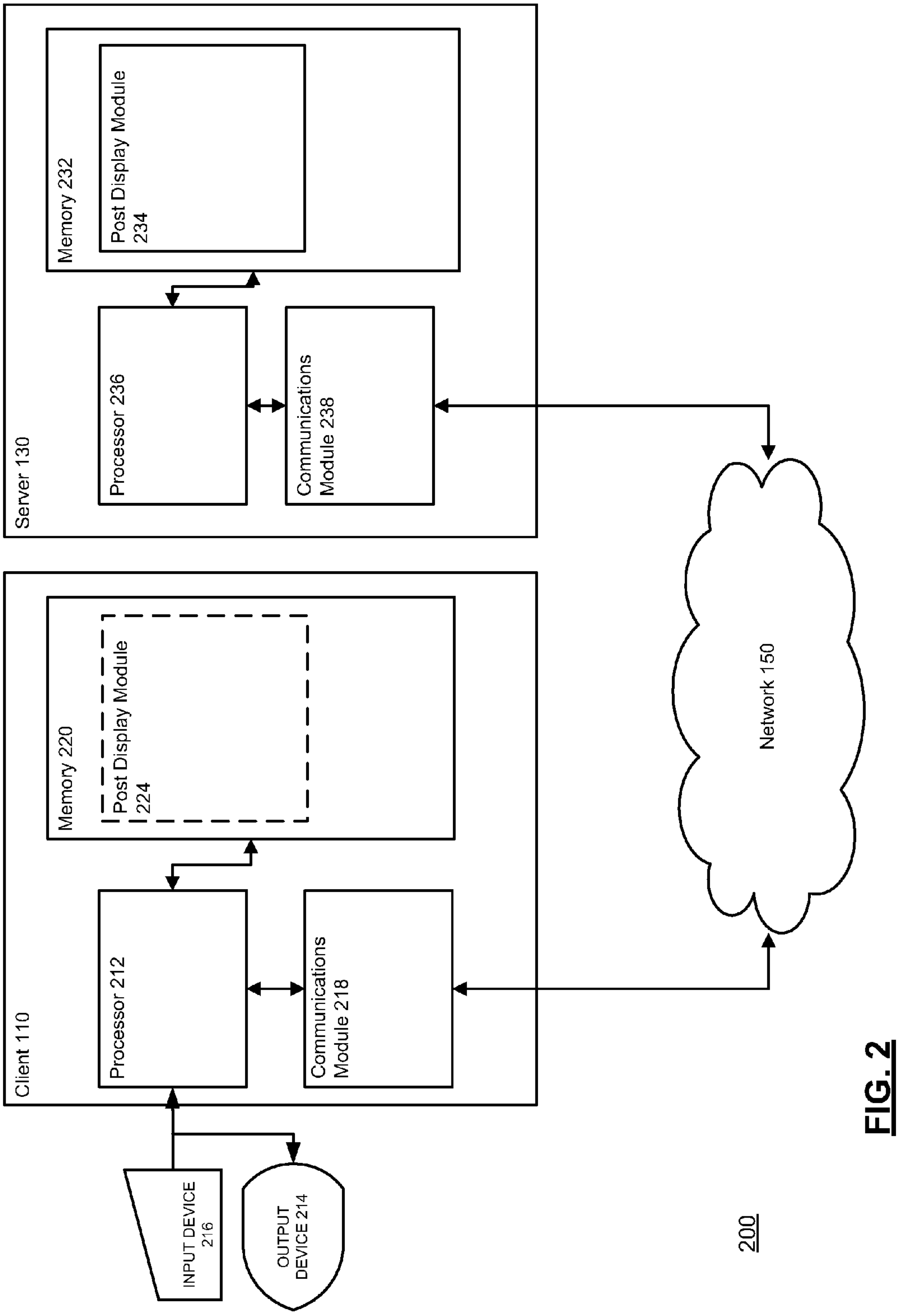
FIG. 2 is a block diagram illustrating an example client and server from the system of FIG. 1 according to certain aspects of the disclosure.

FIG. 2 is a block diagram illustrating an example client and server from the system 100 of FIG. 1 according to certain aspects of the subject technology. The client 110 and the server 130 are connected over the network 150 via respective communications modules 218 and 238 and are configured to interface with the network 150 to send and receive information, such as data, requests, responses, and commands to other devices on the network. The communications modules 218 and 238 can be, for example, modems or Ethernet cards.

The client 110 includes a processor 212, a communications module 218, and a memory 220 that may include a post display module 224.

The processor 212 of the client 110 is configured to execute instructions, such as instructions physically coded into the processor 212, instructions received from software in memory 220, or a combination of both. For example, the input device 216 may provide information to processor 212 which is processed by a post display module 224 stored in memory 220. The information may then be sent through network 150 via communications module 218 to server 130, which receives the information through communications module 238.

Server 130 includes a processor 236, a communications module 238, and a memory 232 that may include a post display module 234.

Processor 236 is configured to execute instructions, such as instructions physically coded into the processor 236, instructions received from software in memory 232, or a combination of both.

Processor 236 processes information from post display module 234 and sends information through communications module 238, through network 150, to client 110 to be displayed on output device 214.

Example Processes

Figure 3:
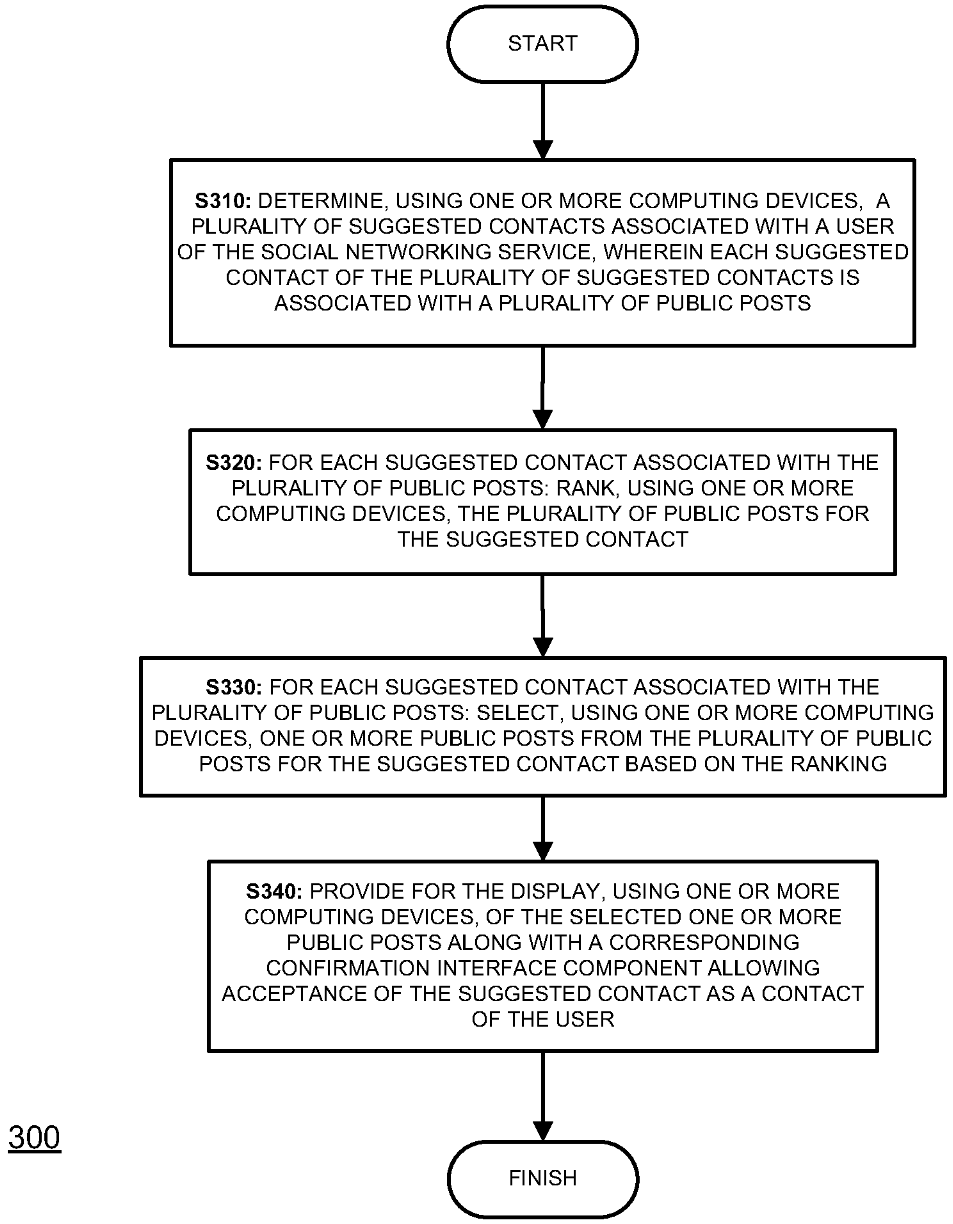
FIG. 3 illustrates an example process for displaying public posts within a social networking service.

FIG. 3 illustrates an example process 300 for displaying public posts within a social networking service as shown by the example client 110 and server 130 of FIG. 2 that can provide for the display of public posts of suggested contacts to a user of a social networking service. Although process 300 of FIG. 3 is described with reference to FIG. 2, the process 300 is not limited to such a configuration and can be applied to other systems and configurations. The process 300 may be conducted when a user initially joins the social network as a new participant of the social networking service. The process 300 may also be conducted at any time the user is a member of the social network. The user may initially establish a user profile following an invitation to join the social networking service that the user receives via email or through any other communication. The user may additionally access the social networking service without an invitation, or through another service such as an email service or through another social networking service. The process 300 may be conducted when the user has not received a new post from the user's existing contacts within a specified period of time or if the user receives less than a specified number of new posts from the user's existing contacts within a specified period of time.

The process beings with step S310, in which the server 130 determines a plurality of suggested contacts associated with a user of a social networking service, wherein each suggested contact of the plurality of suggested contacts is associated with a plurality of public posts. Suggested contacts of the user may be current users of the social networking service. Suggested contacts may comprise users on a preexisting contact list of the user, users on a list of popular users of the social networking services, or users that are associated with current contacts of the user within the social networking service. A preexisting contact list of the user may include users of the social networking service that are also contacts in the user's email address book, contacts in another social networking service, contacts that are associated with the user based on blog or short message services, and the like. Popular users of the social networking service may be determined as suggested contacts. Popularity of a user may be determined by users that have exceeded a threshold limit of other contacts, comments on the user's posts, or other criteria such as user ratings, frequency of posting, and the like.

Contacts of the user's present contacts may additionally be determined as suggested contacts of the user. For instance, the user may currently have a classmate as a contact of the user. The classmate may have several friends as contacts of the classmate in the classmate's user profile. The classmate's friends may then be determined as a suggested contact for the user. Suggested contacts may additionally be determined based on the content of public posts of the suggested contact or the popularity of a public post of the plurality of public posts of the suggested contact. If contacts of the user have commented on a public post of a user that is not a contact of the user, that user may be determined to be a suggested contact for the user.

In step S320, for each suggested contact associated with the plurality of public posts, the server 130 may rank the plurality of public posts for the suggested contact. A public post may be any post that has been posted by the suggested contact without limiting the recipients or viewers of the post. Posts of the user that are published only to a selected group of users (e.g., a selected group of users that excludes the user) are not included as public posts. The user may designate the level of publicity by groups or individuals. A public post may also include posts that have been authorized for display as a public post of a suggested contact by setting a user preference. In this instance, the public post may be published to a selected group of users that includes users viewing the poster's profile as a suggested contact.

Ranking of the public posts for the suggested contact may be based on content of each post, popularity of the public posts among other users, posting date of the public posts, or the number of comments associated with the public posts. Ranking based on the content of each post may be performed by determining posts that are relevant to the user's interests or preferences and may be performed by text analysis of the user's profile or the like. Popularity of the public posts among other users may be determined by the number of views of the post and the number of times a post has been reposted. Popularity of a public post may be indicated based on reviews provided by other users. Posting date may be used as a basis for ranking. For instance, new posts may be favored, posts that are older than a specified date may be ranked lower, or posts within a certain time frame may be ranked higher or lower. The number of times a public post of a suggested contact has been provided to the user may also be a basis for the ranking of the public posts. Ranking may be performed based on one or more criteria.

In step S330, for each suggested contact associated with the plurality of public posts, the server 130 may select a public post from the plurality of public posts based on the ranking. One or more posts may be selected for each suggested contact, with the selected posts having the highest rank. A suggested contact who has only posted one public post may result in that post being automatically chosen.

A post may be generated for an additional suggested contact that has no public posts. The generated post may indicate the relationship between the additional suggested contact and the user. A generated post may contain generated text stating that the suggested contact is a user of the social networking service who also appears as a contact in the user's email address book. The relationship between the additional suggested contact and the user may include the basis for determining the suggested contact as an additional suggested contact for the user. Generated posts may be displayed along with selected public posts of suggested contacts or may be displayed separately. A generated post may include an indication that the suggested contact currently has no public posts, may include an indication that the suggested contact has posts that are not public, and may include an indication that the post was generated.

The process ends in step S340 in which the selected public posts are displayed on the user's profile in the social networking service.

The selected public posts may be provided for display to the user in a prioritized display. The selected public posts may be further ranked to provide the prioritized display of the selected public posts. Ranking and prioritized display may be based on the proximity of relationship of the suggested contact to the user, popularity of the selected public post, type of content, likelihood of the user to select the suggested contact as a contact of the user, or the like. Prioritized display of the selected public posts may also be temporally based with respect to the content of the public post, date of posting, length of membership of the suggested contact, or the like. Prioritized display may also be determined on the basis of the content of each post, popularity of the public posts among other users, posting date of the public posts, or the number of comments associated with the public posts.

A user may select a suggested contact by moving a mouse over or clicking a confirmation interface component, such as a graphical component that allows acceptance of the suggested contact that corresponds to the display of the selected public post. Upon selection, the server 130 may establish the suggested contact as a contact of the user in the social networking service.

Once the user has established a suggested contact as a contact of the user in the social networking service, the user's profile may display the public posts of the contact and may provide for the display of posts of the user to the contact via the contact's user profile.

Example Interfaces

Figure 4:
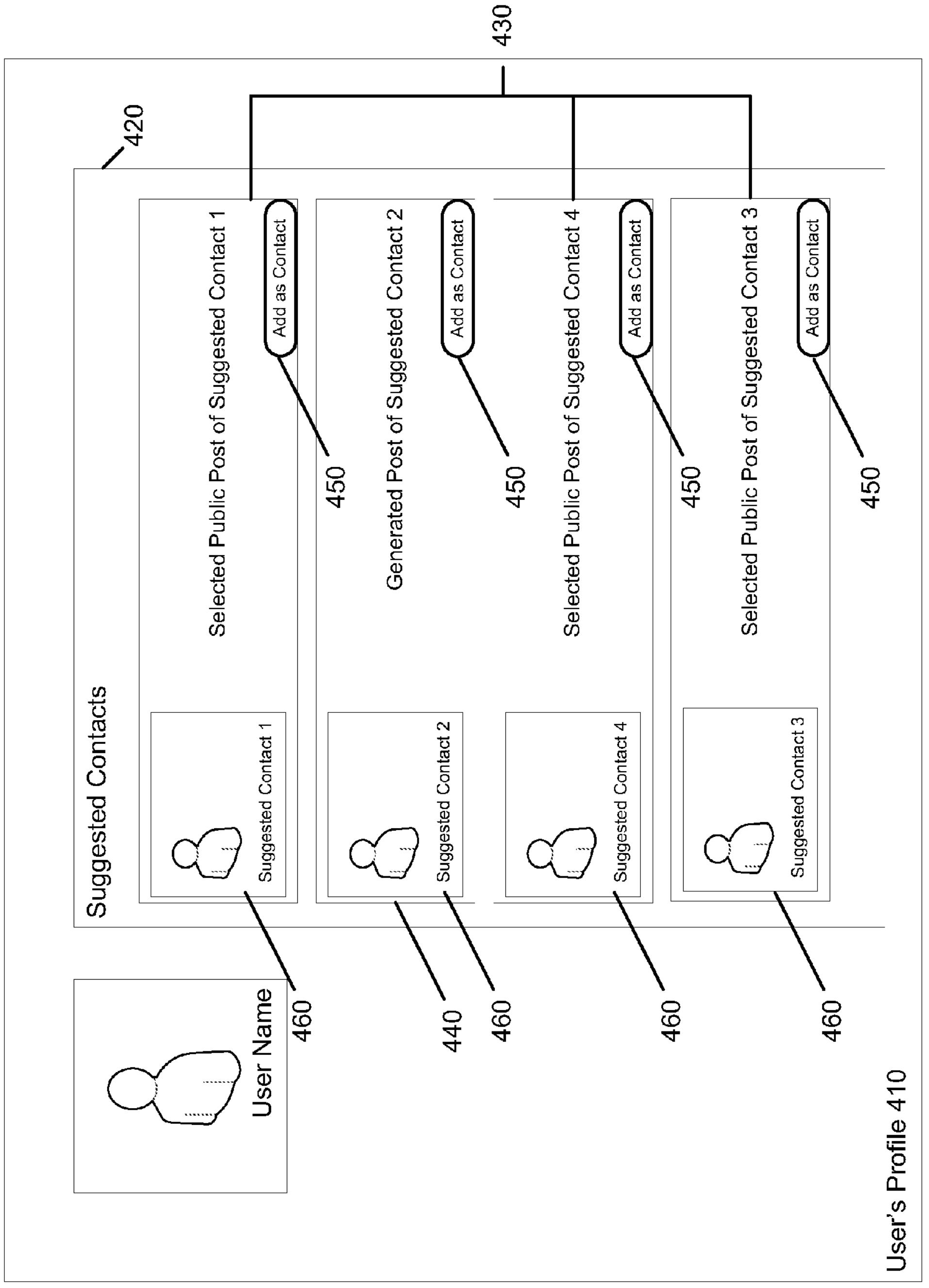
FIG. 4 is an example illustration of a user interface as it relates to aspects of the subject technology.

FIG. 4 is an example illustration of a display 400 of a user profile as it relates to aspects of the subject technology. The user's profile 410 may display the selected public posts as an initial display of the public post of suggested contacts. A portion of the user profile 420 may be dedicated to displaying suggested contacts. The dedicated portion of the user profile 420 may appear on the user's profile each time the user logs into his user account or may be accessible from other parts of the user's profile. Selected public posts 430 and generated post 440 may be displayed in the dedicated portion of the user profile 420 and may be listed in reverse chronological order based on the original posting date of the selected public post, the posts may be listed based on a rank of suggested contacts, or the posts may be listed arbitrarily.

A confirmation interface component, such as graphical component 450 may appear on a portion of the selected public posts 430 and generated post 440 to facilitate the user adding the suggested contact as a contact of the user in the social networking service. The user may select the suggested contact as a contact of the user by clicking or moving a mouse over the graphical component 450. Each selected public post 430 and generated post 440 may include an identifying component 460. Identifying component 460 may include the suggested contact's user name, actual name, profile image, and/or other identifying information. The identifying component 460 may be a link to the suggested contact's user profile.

Additional Example Embodiments

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject technology can be implemented as sub-parts of a larger program while remaining distinct software aspects of the subject technology. In some implementations, multiple software aspects can also be implemented as separate programs. Finally, any combination of separate programs that together implement a software aspect described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
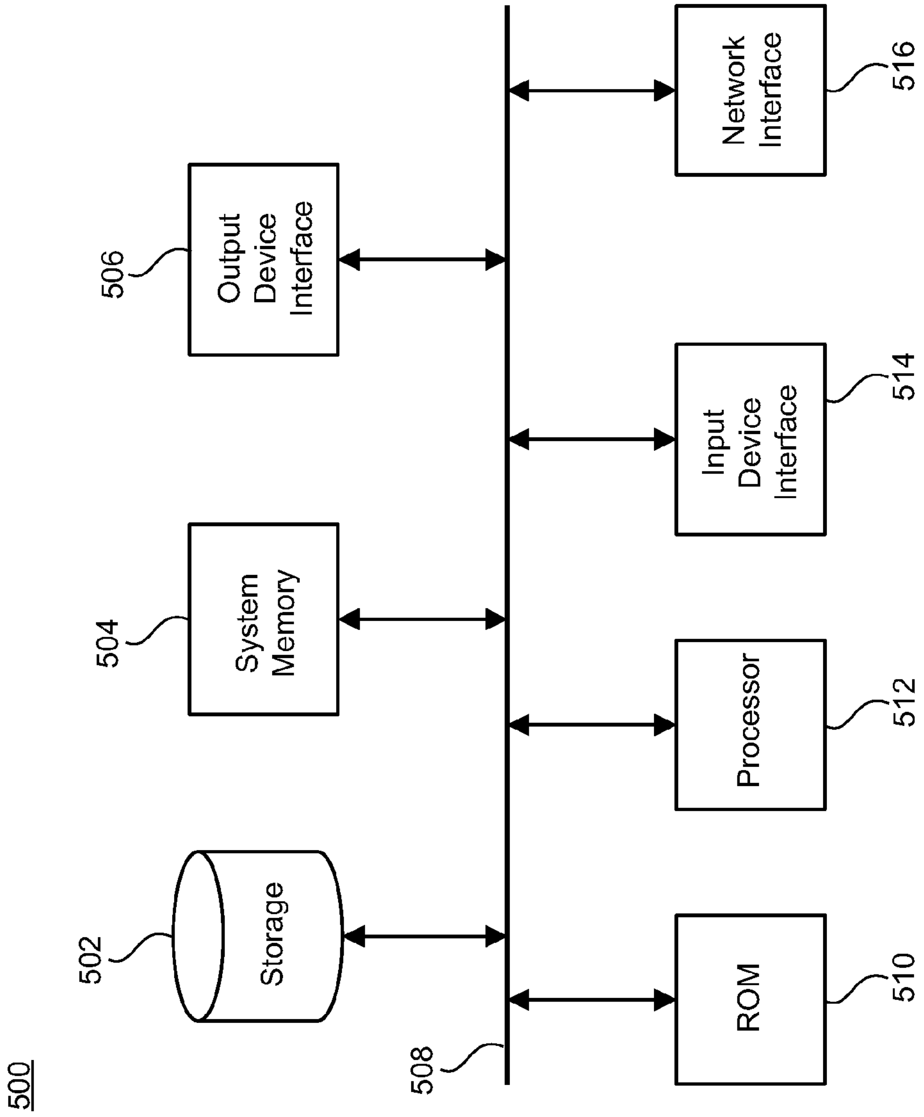
FIG. 5 is a block diagram illustrating an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject technology. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject technology use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as a random access memory. System memory 504 stores some of the instructions and data that the processor needs at runtime. In some implementations, the processes of the subject technology are stored in system memory 504, permanent storage device 502, and/or ROM 510. For example, the various memory units include instructions for providing for display of public posts within a social networking service in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers such as a local area network ("LAN"), a wide area network ("WAN"), or an Intranet, or a network of networks, such as the Internet. Any or all components of electronic system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology. Features described under one heading or one subheading of the subject disclosure may be combined, in various embodiments, with features described under other headings or subheadings. Further, it is not necessarily the case that all features under a single heading or a single subheading are used together in embodiments.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method of displaying public posts within a social networking service, the method comprising:

determining, using one or more computing devices, a plurality of suggested contacts associated with a user of the social networking service, wherein each suggested contact of the plurality of suggested contacts is associated with a plurality of public posts;

for each suggested contact associated with the plurality of public posts:

ranking, using one or more computing devices, the plurality of public posts for the suggested contact;

selecting, using one or more computing devices, one or more public posts from the plurality of public posts for the suggested contact based on the ranking; and providing for display, using one or more computing devices, of the selected one or more public posts along with a corresponding confirmation interface component allowing acceptance of the suggested contact as a contact of the user of the social networking service, wherein the determining is conducted when the user of the social networking service has not received a new post from existing contacts of the user of the social networking service within a specified period of time, wherein the ranking of the plurality of public posts is based on content of each post, popularity of the public posts among other users, posting date of the public posts, or number of comments associated with the public posts.

2. The method of claim 1, further comprising:

receiving, using one or more computing devices, a user request to accept a suggested contact of the plurality of suggested contacts as a contact of the user of the social networking service via the corresponding confirmation interface component; and establishing, using one or more computing devices, the suggested contact as the contact of the user of the social networking service.

3. The method of claim 2, further comprising:

providing for display, using one or more computing devices, of the public posts of the contact of the user of the social networking service in a profile of the user of the social networking service.

4. The method of claim 2, further comprising:

providing for display, using one or more computing devices, of posts of the user of the social networking service to a user profile of the contact.

5. The method of claim 1, further comprising:

generating, using one or more computing devices, a post for an additional suggested contact with no public posts, based on an association of the additional suggested contact with the user of the social networking service; and providing for display, using one or more computing devices, of the generated post.

6. The method of claim 5, wherein the generated post comprises relationship information, the relationship information describing a relationship between the additional suggested contact and the user of the social networking service.

7. The method of claim 1, wherein at least one suggested contact of the plurality of suggested contacts is a user on a preexisting contact list of the user of the social networking service, a user on a list of popular users, or a user that is associated with current contacts of the user of the social networking service.

8. The method of claim 1, wherein at least one suggested contact of the plurality of suggested contacts is determined based on the content of the public posts of the at least one suggested contact.

9. The method of claim 1, wherein at least one suggested contact of the plurality of suggested contacts is determined based on popularity of a public post of the plurality of public posts of the at least one suggested contact.

10. The method of claim 1, wherein multiple public posts for at least one suggested contact are selected from the plurality of public posts of the at least one suggested contact based on the ranking.

11. The method of claim 1, wherein the determining, ranking, selecting, and providing steps are performed in conjunction with establishing a profile of the user of the social networking service.

12. A system of displaying public posts within a social networking service, the system comprising:

one or more processors; and a memory containing processor-executable instructions that, when executed by the one or more processors, cause the system to:

determine a plurality of suggested contacts associated with a user of the social networking service, wherein each suggested contact of the plurality of suggested contacts is associated with a plurality of public posts;

for each suggested contact associated with the plurality of public posts:

rank the plurality of public posts for the suggested contact;

select one or more public posts from the plurality of public posts for the suggested contact based on the ranking;

generate a post for an additional suggested contact with no public posts, based on an association of the additional suggested contact with the user of the social networking service; and provide for display of the generated post and the selected one or more public posts along with a corresponding confirmation interface component allowing acceptance of the suggested contacts and the additional suggested contact as contacts of the user of the social networking service, wherein the determining is conducted when the user of the social networking service has not received a new post from existing contacts of the user of the social networking service within a specified period of time, wherein the ranking of the plurality of public posts is based on content of each post, popularity of the public posts among other users, posting date of the public posts, or number of comments associated with the public posts.

13. The system of claim 12, wherein the system is further caused to:

receive a user request to accept a suggested contact of the plurality of suggested contacts as a contact of the user of the social networking service via the corresponding confirmation interface component; and establish the suggested contact as the contact of the user of the social networking service.

14. The system of claim 13, wherein the system is further caused to:

provide for display of the public posts of the contact of the user in a profile of the user of the social networking service.

15. The system of claim 13, wherein the system is further caused to:

provide for display of posts of the user of the social networking service to a user profile of the contact.

16. The system of claim 12, wherein the generated post comprises relationship information, the relationship information describing a relationship between the additional suggested contact and the user of the social networking service.

17. The system of claim 12, wherein at least one suggested contact of the plurality of suggested contacts is a user on a preexisting contact list of the user of the social networking service, a user on a list of popular users, or a user that is associated with current contacts of the user of the social networking service within the social networking service.

18. The system of claim 12, wherein at least one suggested contact of the plurality of suggested contacts is determined based on the content of the public posts of the at least one suggested contact.

19. The system of claim 12, wherein at least one suggested contact of the plurality of suggested contacts is determined based on popularity of a public post of the plurality of public posts of the suggested contact.

20. The system of claim 12, wherein multiple public posts for at least one suggested contact are selected from the plurality of public posts of the at least one suggested contact based on the ranking.

21. The system of claim 12, wherein the system is caused to determine the plurality of suggested contacts associated with the user of the social networking service in conjunction with establishing a profile of the user of the social networking service.

22. A non-transitory machine-readable storage medium comprising machine-readable instructions for causing a processor to execute a method for displaying public posts within a social networking service, the method comprising:

determining a plurality of suggested contacts associated with a user of the social networking service, wherein each suggested contact of the plurality of suggested contacts is associated with a plurality of public posts;

for each suggested contact associated with the plurality of public posts:

ranking the plurality of public posts for the suggested contact;

selecting one or more public posts from the plurality of public posts for the suggested contact based on the ranking; and providing for display of the selected one or more public posts along with a corresponding confirmation interface component allowing acceptance of the suggested contact as a contact of the user of the social networking service;

receiving a user request to accept a suggested contact of the plurality of suggested contacts as a contact of the user of the social networking service via the corresponding confirmation interface component; and establishing the suggested contact as the contact of the user of the social networking service, wherein the determining is conducted when the user of the social networking service receives less than a specified number of new posts from existing contacts of the user of the social networking service within a specified period of time, wherein the ranking of the plurality of public posts is based on content of each post, popularity of the public posts among other users, posting date of the public posts, or number of comments associated with the public posts.

23. The machine-readable storage medium of claim 22, the method further comprising:

providing for display of the public posts of a contact of the user of the social networking service in a profile of the user of the social networking service.

24. The machine-readable storage medium of claim 22, the method further comprising:

generating a post for an additional suggested contact with no public posts, based on an association of the additional suggested contact with the user of the social networking service; and providing for display of the generated post.

25. The machine-readable storage medium of claim 24, wherein the generated post comprises relationship information, the relationship information describing a relationship between the additional suggested contact and the user of the social networking service.

26. The machine-readable storage medium of claim 22, wherein at least one suggested contact of the plurality of suggested contacts is a user on a preexisting contact list of the user of the social networking service, a user on a list of popular users, or a user that is associated with current contacts of the user of the social networking service within the social networking service.

27. The machine-readable storage medium of claim 22, wherein at least one suggested contact of the plurality of suggested contacts is determined based on the content of the public posts of the at least one suggested contact.

28. The machine-readable storage medium of claim 22, wherein at least one suggested contact of the plurality of suggested contacts is determine based on popularity of a public post of the plurality of public posts of the at least one suggested contact.

29. The machine-readable storage medium of claim 22, wherein the determining, ranking, selecting, and providing steps are performed while the user is initially establishing a profile of the user of the social networking service.

* * * * *